United States Patent
Guinehut et al.

(10) Patent No.: US 10,233,810 B2
(45) Date of Patent: Mar. 19, 2019

(54) DEVICE TO REDUCE NITROGEN MONOXIDE AND NITROGEN DIOXIDE EMISSIONS IN THE EXHAUST FUMES OF A COMBUSTION ENGINE

(71) Applicant: Faurecia Systems D'Echappement, Nanterre (FR)

(72) Inventors: Sebastien Guinehut, Belfort (FR); Alice Devinat Pigeon, Dinge (FR); Christophe Baverel, Audincourt (FR); Christophe Viault, Belfort (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 237 days.

(21) Appl. No.: 15/021,966

(22) PCT Filed: Sep. 12, 2014

(86) PCT No.: PCT/EP2014/069562
§ 371 (c)(1),
(2) Date: Jun. 27, 2016

(87) PCT Pub. No.: WO2015/036580
PCT Pub. Date: Mar. 19, 2015

(65) Prior Publication Data
US 2016/0298513 A1 Oct. 13, 2016

(30) Foreign Application Priority Data

Sep. 16, 2013 (FR) .................................. 13 58885

(51) Int. Cl.
*B01D 53/94* (2006.01)
*F01N 3/20* (2006.01)
(Continued)

(52) U.S. Cl.
CPC ......... *F01N 3/206* (2013.01); *B01D 53/9431* (2013.01); *F01N 3/2066* (2013.01);
(Continued)

(58) Field of Classification Search
CPC ........ B01D 53/9431; B01D 2251/2062; F01N 3/206; F01N 3/2066; F01N 9/00;
(Continued)

(56) References Cited

U.S. PATENT DOCUMENTS

2006/0037309 A1\* 2/2006 Funk .................. B01D 53/9431
60/286
2010/0047638 A1\* 2/2010 Johannessen ...... B01D 53/9431
429/421
(Continued)

FOREIGN PATENT DOCUMENTS

| DE | 102009060285 A1 | 6/2011 |
|---|---|---|
| DE | 102009060287 A1 | 6/2011 |
| EP | 1199449 A2 | 4/2002 |

OTHER PUBLICATIONS

FR Search Report for French Patent Application No. 1358885 completed May 5, 2014.

*Primary Examiner* — Brandon D Lee
(74) *Attorney, Agent, or Firm* — Carlson, Gaskey & Olds, P.C.

(57) ABSTRACT

A device includes at least one ammonia storage cartridge comprising an outlet orifice for ammonia intended to be connected to an ammonia transport circuit towards an exhaust line. The device includes an obturator to obturate the outlet orifice, and which is capable of changing between an obturation configuration of the outlet orifice and a configuration for clearance the outlet orifice. The device includes a detector to detect at least one predefined situation, and a controller to control the obturator, and which is capable of (Continued)

controlling the transition of the obturators towards their obturation configuration when the detector detects the predefined situation.

15 Claims, 3 Drawing Sheets

(51) Int. Cl.
    *F01N 9/00*     (2006.01)
    *F16K 1/12*     (2006.01)
    *F16K 31/06*     (2006.01)

(52) U.S. Cl.
    CPC .................. *F01N 9/00* (2013.01); *F16K 1/12* (2013.01); *F16K 31/0655* (2013.01); *B01D 2251/2062* (2013.01); *F01N 2560/021* (2013.01); *F01N 2610/02* (2013.01); *F01N 2610/06* (2013.01); *F01N 2610/10* (2013.01); *F01N 2610/1406* (2013.01); *F01N 2610/1473* (2013.01); *F01N 2900/1402* (2013.01); *Y02T 10/24* (2013.01)

(58) Field of Classification Search
    CPC ........... F01N 2560/021; F01N 2610/02; F01N 2610/06; F01N 2610/10; F01N 2610/1406; F01N 2610/1473; F01N 2900/1402; F16K 1/12; F16K 31/0655; Y02A 50/2325; Y02T 10/24
    See application file for complete search history.

(56) References Cited

U.S. PATENT DOCUMENTS

2014/0260199 A1\* 9/2014 Grzesiak ............... F01N 3/0871
    60/274
2015/0252770 A1\* 9/2015 Books .................. B60W 20/40
    701/22

\* cited by examiner

DEVICE TO REDUCE NITROGEN MONOXIDE AND NITROGEN DIOXIDE EMISSIONS IN THE EXHAUST FUMES OF A COMBUSTION ENGINE

RELATED APPLICATION

This is the U.S. national phase of PCT/EP14/69562, filed Sep. 12, 2014, which claims priority to FR 13 58885, filed Sep. 16, 2013.

TECHNICAL FIELD

The present invention relates to a reduction device to reduce nitrogen monoxide and nitrogen dioxide emissions in exhaust gases of a combustion engine.

BACKGROUND

In the state of the art such a reduction device is already known, including at least one cartridge for storing ammonia, said cartridge comprising an ammonia outlet orifice intended to be connected to a circuit for transporting ammonia to an exhaust line of a combustion engine.

When ammonia is injected into the exhaust line, this ammonia reacts with nitrogen monoxide and nitrogen dioxide present in the exhaust gases, by producing nitrogen and water.

Such a reduction device is generally intended to equip a diesel engine, a gasoline engine with direct injection operating with a lean mixture, or any internal combustion engine operating with a lean mixture. More particularly, such a reduction device may equip an automobile vehicle engine, or any type of internal combustion engine, notably fitting out a land, marine or aeronautical vehicle, or further an engine not fitting out a vehicle.

For reasons of safety, the ammonia is not stored in a raw form, but as a material, generally made by absorption or adsorption of ammonia by chlorine-containing metal salts. This thereby obtained material is then stored in said storage cartridge.

During its use, the storage cartridge is heated, either internally or externally, so that the ammonia which is stored therein is released, in order to be injected in gas form into the exhaust line.

It should be noted that ammonia in gas form is particularly toxic. Thus, any leak of ammonia, for example in the case of deterioration of the circuit for transporting the ammonia or in the case of an impact on the automobile vehicle causing a deterioration of the reduction device, may prove to be hazardous.

Moreover, the heat inertia of the cartridges may cause release of ammonia for several tens of minutes, and this even if the heating is deactivated.

SUMMARY

The object of the present invention is notably finding a remedy to this drawback, by providing a secured reduction device.

For this purpose, the object of the invention is notably a reduction device that reduces emissions of nitrogen monoxide and nitrogen dioxide in the exhaust gases of a combustion engine and which overcomes these drawbacks. The reduction device includes at least one ammonia storage cartridge, said cartridge comprising an ammonia outlet orifice, intended to be connected to a circuit for transporting ammonia towards an exhaust line of the combustion engine. The reduction device further it includes:

an obturator for at least one of the cartridges, the obturator capable of changing between an obturation configuration preventing the circulation of ammonia from the outlet orifice and a clearance configuration allowing circulation of ammonia from the outlet orifice, a detector to detect at least a predefined situation, and a controller to control the obturator, the controller being capable of controlling the passage of the obturator towards the obturation configuration when the detector detects the predefined situation.

The obturators give the possibility of closing each cartridge, directly at the outlet orifice or in proximity to this outlet orifice, when a safety fault, corresponding to a predefined situation is detected.

A reduction device according to the invention may further include one or several of the following features, taken alone or according to any technically conceivable combination.

As the reduction device is intended to equip an automobile vehicle, the controllers are powered by an electric energy source specific to the reduction device, distinct and independent of the other standard energy sources of the automobile vehicle.

The detectors include a device to detect ammonia, laid out outside the ammonia transport circuit, and able to measure a concentration of ammonia in air, a predefined situation being a situation in which the measured ammonia concentration is greater than a predetermined threshold, the predetermined threshold, for example, being comprised between 10 and 20 ppm.

The detectors include a device to detect impacts, for example an impact detection device of a system for triggering a safety inflatable airbag, a predefined situation being a situation in which an impact, releasing an amount of energy greater than a predetermined threshold, is detected, for example an impact causing triggering of the safety airbag.

The obturators include a member of the cylinder actuator type, comprising: a body extending along a longitudinal direction, and which comprises a first orifice connected to the outlet orifice of the corresponding cartridge and a second orifice connected to said ammonia transport circuit; a piston comprising a head and a rod, said rod extending in the longitudinal direction and cooperating with a guide to guide the rod in translation in the longitudinal direction, the guide being borne by the body so that the piston is movable, in the longitudinal direction, between an obturation position, in which the head cooperates with the first orifice for obturating this first orifice, and a clearance position, in which the head is away from the first orifice; and an actuator to displace the piston between the obturation and clearance positions.

The piston head is provided with a seal gasket, able to cooperate with the body when the piston is in the obturation position, in order to sealably obturate the first orifice.

The actuators include a solenoid surrounding the piston and coaxially positioned at the rod, said solenoid being able to generate a magnetic field in the longitudinal direction when an electric current crosses it, and the controllers include an electric current provider to have an electric current flow into said solenoid, the electric current provider comprising a switch able to revert the direction of the electric current flowing into the solenoid.

The controllers include an electric current generator, connected to a circulator for circulating electric current.

As the reduction device is intended to equip an automobile vehicle, the electric current generator is specific to the controller, distinct and independent of any other energy source of the automobile vehicle.

The reduction device comprises a first maintainer to maintain the piston in the obturation position.

The first maintainer includes an elastic member with an axial effect, applying an elastic return force of the piston towards the obturation position, extending longitudinally between a first seat borne by the head of the piston and a second seat borne by the body.

The elastic member has stiffness greater than a predetermined value, notably greater than 0.8 N/m.

The reduction device includes a second maintainer to maintain the piston in the clearance position.

The second maintainer includes: a first magnetic element borne by the body, and a second magnetic element borne by the piston rod, able to cooperate with the first magnetic element when the piston is in its clearance position, so that the first and second magnetic elements are attracted by a magnetic attraction force.

The first and second magnetic elements are able to generate an attraction force between them which is greater than the elastic return force generated by the elastic member.

These and other features may be best understood from the following drawings and specification.

BRIEF DESCRIPTION OF THE DRAWINGS

The invention will be better understood upon reading the description which follows, only given as an example and made with reference to the appended Figures wherein.

DETAILED DESCRIPTION

Figure 1:
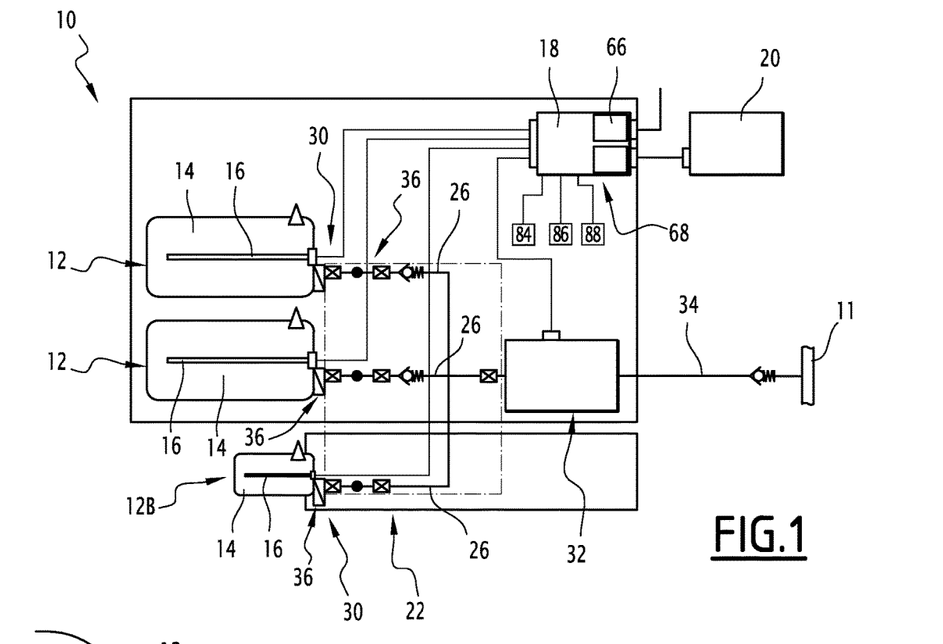
FIG. 1 schematically illustrates a reduction device according to an exemplary embodiment of the invention.

FIG. 1 illustrates a reduction device 10 that reduces nitrogen monoxide and nitrogen dioxide emissions in the exhaust gases of a combustion engine 20, for example an automobile vehicle engine 20. In particular, the combustion engine is equipped with an exhaust line 11, through which the exhaust gases are discharged.

In order to reduce the emissions of nitrogen monoxide and nitrogen dioxide in these exhaust gases, ammonia is injected into the exhaust line 11 in order to react with these exhaust gases.

For this purpose, the reduction device 10 includes at least one ammonia storage cartridge 12. For example, the reduction device 10 conventionally includes three storage cartridges, notably a starting cartridge 12B and two main cartridges 12, the starting cartridge 12B conventionally having dimensions, notably a length, less than those of the main cartridges 12.

Each storage cartridge 12, 12B includes a hermetically sealed tank, in which is housed an ammonia storage member 14. This storage member 14 is formed in a material, a so called storage material, capable of absorbing or adsorbing ammonia.

The storage material for example corresponds to one of the materials described in patent application WO 2008/077652. This material is for example selected from the group known as metal amine complexes and having the general formula $M_a(NH_3)_nX_z$, wherein:

M is one or several cations selected from the group of alkaline metals, such as Li, Na, K or Cs, earth-alkaline metals such as Mg, Ca or Sr, and/or transition metals such as V, Cr, Mn, Fe, Co, Ni, Cu or Zn, or combinations of these metals such as NaAl, KAl, $K_2Zn$, CsCu, or $K_2Fe$, X is one or several anions selected from the group comprising fluorides, chlorides, bromides, iodides, nitrates, thiocyanates, sulfates, molybdates, phosphate ions, a is the number of cations per salt molecule, z is the number of anions per salt molecule, and n is the coordination number comprised between 2 and 12.

For example, the storage material of the cartridge is $Mg(NH_3)_6Cl_2$, or $Sr(NH_3)_8Cl_2$, or further $Ca(NH_3)_8Cl_2$, or a mixture of these elements.

Each cartridge 12, 12B moreover includes a heating element 16, for example arranged inside the storage material 14, coaxially with the latter. This heating element 16 is intended to heat the storage material 14. Thus, when ammonia has to be injected into the exhaust line 11, the heating element 16 is set under an electric voltage in order to heat the storage material 14, which under the effect of heat releases ammonia by a desorption reaction. The heating element 16 may be arranged inside the cartridge 12, 12B, or alternatively on the outside of this cartridge 12, 12B.

It should be noted that each cartridge 12, 12B includes an outlet orifice 30, through which the desorbed ammonia is discharged.

The reduction device 10 conventionally includes a first control unit 18, notably intended to control the application of an electric voltage on each heating element 16. This first control unit 18 is connected to a second control unit of the engine 20 which is able to provide to the first control unit 18 information relating to the operation of the engine 20, so that the first control unit 18 infers therefrom the need of ammonia.

The reduction device 10 moreover includes a transport circuit 22 that transports ammonia to the exhaust line 11. This transport circuit 22 includes, for each cartridge 12, 12B, a first conduit 26 connected to the output orifice 30 of this cartridge 12, 12B. Conventionally, each first conduit 26 includes an anti-return valve, and a stop valve.

Finally, the reduction device 10 includes a dosage metering unit 32 of the conventional type, inserted between the first conduits 26 and a second conduit 34, which opens into the exhaust line 11. This metering unit 32 is controlled by the first control unit 18, and it is intended to meter out the appropriate amount of ammonia to be injected into the exhaust line 11.

In order to improve the safety of the reduction device 10, the latter includes, for each main cartridge 12, an obturator 36, capable of changing between an obturation configuration, preventing emission of ammonia from the outlet orifice 30, and a clearance configuration, allowing emission of ammonia from the outlet orifice 30 towards the transport circuit 22, notably towards the first corresponding conduit 26.

In the example of FIG. 1, the obturator 36 are directly arranged on the outlet orifice 30 of the corresponding cartridge 12. Alternatively, the obturator 36 may be arranged on the first conduit 26 preferably corresponding to the proximity of the outlet orifice 30.

The starting cartridge 12B also includes an obturator 36 in the embodiment of FIG. 1.

However, alternatively, the starting cartridge 12B may be provided without such obturator 36. Indeed, because of its reduced dimensions, the starting cartridge 12B has a much higher heat inertia than those of the main cartridges 12. Thus, the risks of ammonia release are reduced for the starting cartridge 12B and remain under control. Consequently for economic reasons, it may be decided not to equip the starting cartridge 12B with the obturator 36.

Figure 2:
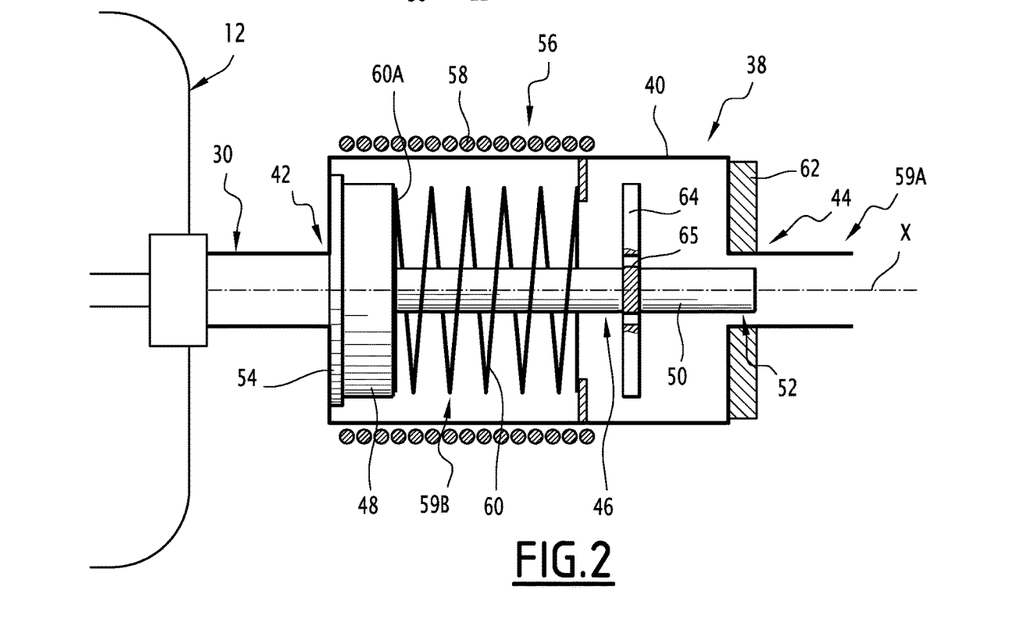
FIGS. 2 and 3 are schematic axial sectional views of an obturator fitting out the reduction device of FIG. 1, in an obturation configuration and a clearance configuration respectively.
Figure 3:
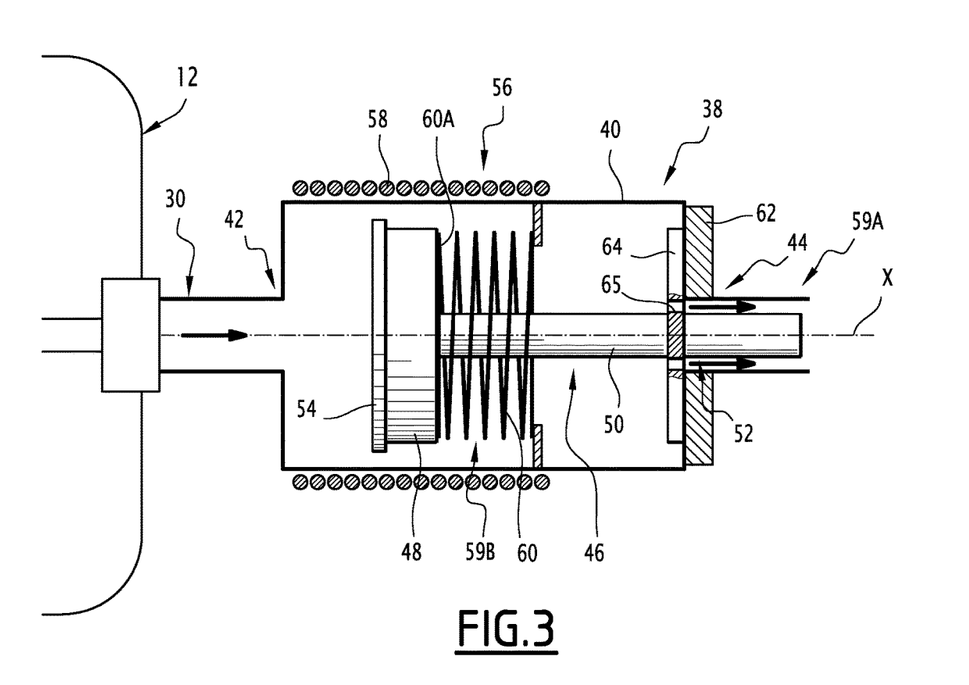

The obturators 36 according to a first embodiment, fitting out the reduction device 10 are illustrated in FIGS. 2 and 3. More particularly, the obturation configuration is illustrated in FIG. 2, and the clearance configuration is illustrated in FIG. 3.

These obturators 36 include a member 38 of the cylinder actuator type, comprising a body 40 extending along a longitudinal direction X. The body 40 comprises a first orifice 42 connected to outlet orifice 30 of the corresponding cartridge 12, 12B, and a second orifice 44, connected to the ammonia transport circuit 22, more particularly to the first corresponding conduit 26.

The member 38 further includes a piston 46, comprising a head 48 and a rod 50.

The rod 50 extends in the longitudinal direction X, and cooperates with a guide 52 that guides, in translation, the rod 50 in the longitudinal direction X. The guide 52 is borne by the body 40.

Thus, the piston 46 is movable, in the longitudinal direction X, between an obturation position (illustrated in FIG. 2), in which the head 48 cooperates with the first orifice 42 for obturating this first orifice 42, and a clearance position (illustrated in FIG. 3) in which the head 48 is away from the first orifice 42.

Advantageously, the piston head 48 is provided with a seal gasket 54, able to cooperate with the body 40, notably with a contour of the first orifice 42, when the piston 46 is in its obturation position, in order to sealably obturate the first orifice 42.

The radial dimensions of the head 48 are greater than the radial dimensions of the first orifice 42, so that the head 48 covers this first orifice 42 in the obturation position.

On the other hand, the radial dimensions of the head 48 and of the seal gasket 54 are less than the inner radial dimensions of the body 40, so as to define a radial passage for circulation of the ammonia between the body 40 and the head 48, so that ammonia may circulate from the first orifice 42 as far as the second orifice 44 when the piston 46 is in the clearance position.

The obturators 36 moreover include an actuator 56 that moves the piston 46 between its obturation and clearance positions.

The actuator 56, for example, includes a generator to generate a magnetic field in the longitudinal direction X, the piston 46 being made of a ferromagnetic material. Thus, the piston 46 may be moved in the longitudinal direction X under the effect of a magnetic force induced by said magnetic field.

According to this first described embodiment, the generator includes a solenoid 58 surrounding the piston 46, for example surrounding the body 40, positioned coaxially with the rod 50. This solenoid 58 is able to generate a magnetic field in the longitudinal direction when an electric current flows through it. Controllers 68 include an electric current provider 84 to have an electric current flow into the solenoid 58, where the electric current provider 84 comprises a switch able to revert the direction of the electric current flowing into the solenoid 58.

The actuator 56 moreover includes a circulator that circulates an electric current in the solenoid 58. These actuators 56 also comprise a switch able to reverse the direction of the electric current flowing in the solenoid 58, in order to reverse the direction of orientation of the generated magnetic field, depending on the desired direction of displacement of the piston 46.

Advantageously, the actuator 56 includes a generator 86 of an electric current, connected to the circulator. This electric current generator 86 is, for example, specific to the control independent of the other electric current generators of the automobile vehicle, so as to be able to operate even in the case of a fault of the latter.

Preferably, the obturators 36 include a first maintainer 59A that maintains the piston 46 in an obturation position, and a second maintainer 59B that maintains the piston 46 in a clearance position.

The first maintainer 59A, for example, includes an elastic member 60 with an axial effect, applying an elastic return force of the piston 46 towards its obturation position. This elastic member 60, for example, extends longitudinally between a first seat 60A borne by the head of the piston 48 and a second seat 60B borne by the body 40, for example a flange added to the inside of the body 40.

The elastic member 60 has stiffness greater than a predetermined value, notably greater than 0.8 N/m.

This stiffness is selected so that the elastic force sufficiently opposes the pressure inside the cartridge 12, 12B, in order to avoid undesirable opening of the obturator 36.

Moreover, the second maintainer 59B includes a first magnetic element 62 borne by the body 40 and a second magnetic element 64 borne by the piston rod 50. The second magnetic element 64 is able to cooperate with the first magnetic element 62 when the piston 46 is in its clearance position, which is illustrated in FIG. 3. Thus, a magnetic attraction force is applied between the first 62 and the second 64 magnetic elements.

Advantageously, the second magnetic element 64 includes at least one orifice for letting through ammonia 65, laid out facing the second orifice 44, in order to allow the passing of ammonia from the body 40 towards the first conduit 26 when the second magnetic element 64 is flattened against the first magnetic element 62.

The first 62 and second 64 magnetic elements are selected so that said magnetic attraction force when they are in contact is greater than the elastic return force generated by the elastic member 60. Thus, the elastic member 60 alone is not sufficient for detaching the first 62 and second 64 magnetic elements when they are in contact.

On the other hand, when the first 62 and second 64 magnetic elements are at a distance from each other, the magnetic attraction force between them is negligible. Thus, this magnetic attraction force is not opposed to the maintaining of the piston 46 in the obturation position.

When the obturators 36 are in a clearance configuration, i.e. that the piston 46 is in a clearance position, which is illustrated in FIG. 3, the piston 46 is maintained in its clearance position by the second maintainer 59B.

In order to have the obturator 36 pass to their obturation configuration, an electric current flows in a first direction in the solenoid 58, so that the latter generates a magnetic field oriented in a first direction. A magnetic force in a first direction, stemming from the magnetic field, is therefore applied to the piston 46. The sum of this magnetic force in the first direction and the elastic return force is greater than the attraction force between the first 62 and second 64 magnetic elements. Thus, these first 62 and second 64 magnetic elements are detached, and the piston 46 then moves as far as its obturation position, illustrated in FIG. 2.

In the obturation position, the first 62 and second 64 magnetic elements are sufficiently away from each other so that the magnetic attraction force between them is negligible. Moreover, the piston 46 is maintained in this position by the elastic member 60, as indicated earlier.

In order to have the obturator 36 pass through their clearance position, an electric current flows in a second direction into the solenoid 58, so that the latter generates a magnetic field oriented in a second direction opposite to the first direction. A magnetic force in a second direction is therefore applied to the piston 46. This magnetic force is greater than the elastic return force applied by the elastic member 60, so that the piston 46 is driven towards its clearance position.

Figure 4:
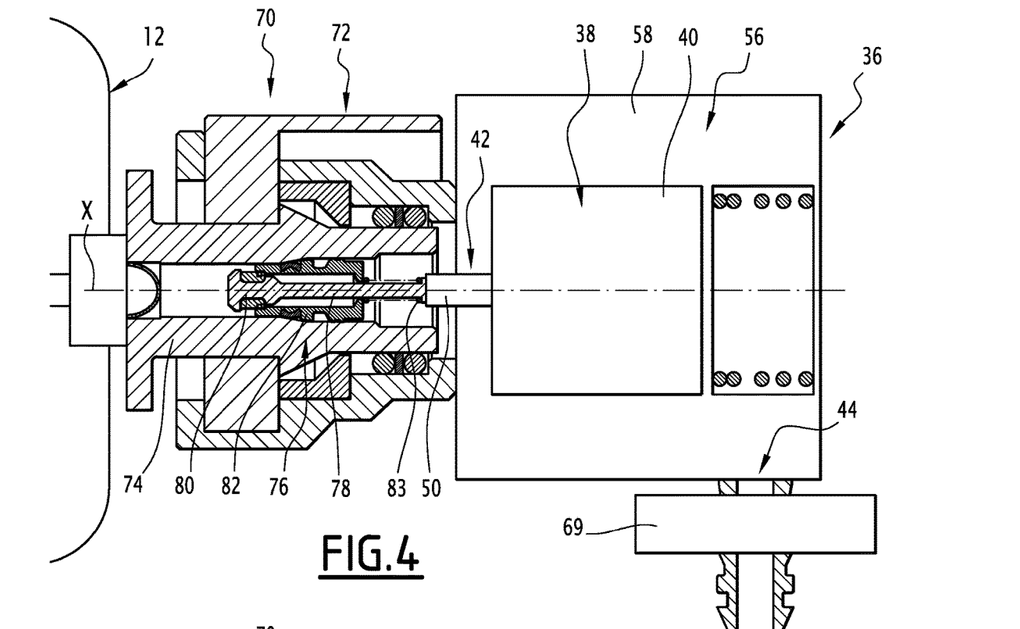
FIGS. 4 and 5 are schematic axial sectional views of an obturator according to a second embodiment, in an obturation configuration and a clearance configuration respectively.
Figure 5:
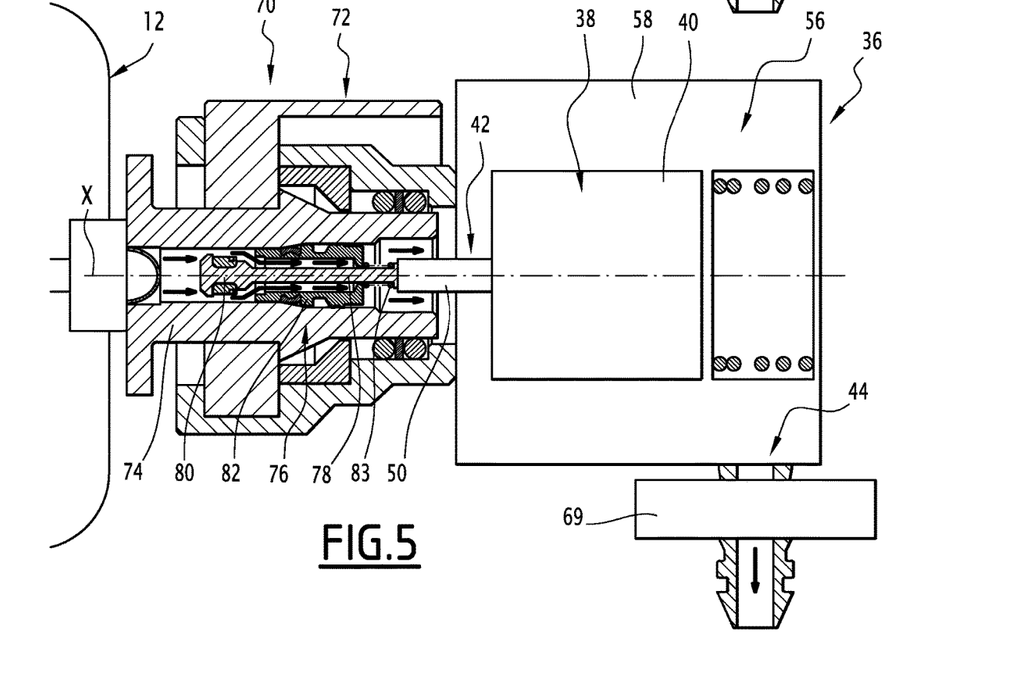

Obturators 36 according to a second embodiment, fitting out the reduction device 10 are illustrated in FIGS. 4 and 5. More particularly, the obturation configuration is illustrated in FIG. 4, and the clearance configuration is illustrated in FIG. 5.

These obturators 36 include a member 38 of the cylinder actuator type, comprising a body 40 extending along a longitudinal direction X. The body 40 comprises a first orifice 42 connected to an obturation member 70, and a second orifice 44, connected to the ammonia transport circuit 22, and more particularly to the first corresponding conduit 26. Advantageously, the second orifice 44 is fitted with an anti-return valve 69, laid out for preventing a backflow of ammonia from the first conduit 26 to the body 40.

The member 38 further includes a piston, notably a rod 50.

The rod 50 extends in the longitudinal direction X, and cooperates with a guide that guides, in translation, the rod 50 in the longitudinal direction X. The guide is borne by the body 40.

Thus, the piston is movable in the longitudinal direction X, between an obturation position (illustrated in FIG. 4), and a clearance position (illustrated in FIG. 5).

The obturation member 70 includes a sleeve 72 secured to the body 40. This sleeve 72 may be formed in one piece, or in an assembly of several parts. The sleeve 72 is fitted onto a connecting conduit 74, which is directly or indirectly connected to the outlet orifice 30 of the corresponding cartridge 12, 12B.

A valve 76 is laid out in the connecting conduit 74, said valve 76 comprising a valve rod 78 provided with a head 80, and a tubular member 82 forming a valve joint. The valve rod 78 is movable in said tubular member 82, between a first position (FIG. 4), in which the head 80 is in sealed contact with an end mouth of the tubular member 82, and a second position (FIG. 5), in which the head 80 is away from the end mouth.

Thus, in a first position of the valve 76, the obturators 36 are in an obturation configuration, and in the second position of the valve 76, the obturators 36 are in a clearance configuration.

The valve rod 78 may be in contact with the piston rod 50, and laid out in the extension of the latter. Thus, this valve rod 78 is actuated by the piston rod 50. More particularly, the valve rod 78 may be urged towards its second position by the piston rod 50.

Moreover, the valve 76 includes an elastic return member 83 of the valve rod 78 towards it first position, this elastic member 83 extending between a seat made on the valve rod 78 and a seat made on the tubular member 82.

The obturators 36 moreover include an actuator 56 that displaces the piston between its obturation and clearance positions.

The actuator 56, for example, include a generator that generates a magnetic field in the longitudinal direction X, the piston being made of a ferromagnetic material. Thus, the piston is displaceable in the longitudinal direction X under the effect of a magnetic force induced by said magnetic field.

The generators, for example, include a solenoid 58 surrounding the piston, for example surrounding the body 40, positioned coaxially with the rod 50. This solenoid 58 is able to generate a magnetic field in the longitudinal direction when an electric current flows through it.

The actuators 56 moreover include a circulator that circulates an electric current in the solenoid 58. These actuators 56 also comprise a switch able to reverse the direction of the electric current flowing in the solenoid 58, in order to reverse the direction of orientation of the generated magnetic field, according to the desired displacement direction of the piston 46.

Advantageously, the reduction device 10 includes an electric current generator 86, connected to the circulator. This electric current generator 86 is, for example, specific to the reduction device 10, distinct and independent of the other energy sources, notably of the other generators of electric current of the automobile vehicle, so as to be able to operate even in the case of failure of the latter.

Preferably, the obturators 36 include a first maintainer that maintains the piston in an obturation position, and a second maintainer that maintains the piston in a clearance position.

It will be noted that under normal operating conditions of the reduction device, the obturators 36 are in a clearance configuration. On the other hand, in the case of an anomaly, the obturators 36 pass into an obturation configuration.

For this purpose, the reduction device 10 includes a detector 66 that detects at least one predefined situation, generally corresponding to an anomaly, and a controller 68 that controls the obturators 36, able to control the passing of the obturators 36 to their obturation configuration when the detectors 66 detect said predefined situation.

More particularly, the controllers 68 are connected to the actuators 56 and control the emission of an electric current in the first or second direction into the solenoid 58. These controllers 68 are powered by an electric energy source 88 specific to the reduction device 10, distinct and independent of the other conventional energy sources of the automobile vehicle. For example, this electric energy source 88 is formed with said electric current generator 86.

The detectors 66, for example, include a device for detecting ammonia, laid outside the ammonia transport circuit 22 and able to measure an ammonia concentration in air. Thus, one of the predefined situations is defined as being a situation in which the measured ammonia concentration is greater than a predetermined threshold, for example a threshold comprised between 10 and 20 ppm (parts per million).

Indeed, when this measured ammonia concentration is greater than said predetermined threshold, it is considered that there is a leak in the ammonia transport circuit 22. In this case, the obturator 36 pass into an obturation position for stopping the leak of ammonia directly at the source, i.e. at the outlet orifice 30 of each cartridge 12, 12B.

Alternatively, or as a combination with the ammonia detection device, the detectors 66 include a device that detects an impact. For example, in the case when the reduction device 10 fits out an automobile vehicle, the impact detection device is the one fitting out a system for triggering a safety inflatable airbag of this automobile vehicle, of a conventional type.

In this case, a predefined situation is defined as being a situation in which an impact, releasing an amount of energy greater than a predetermined threshold, is detected.

For example, such an impact corresponds to an impact causing triggering of a safety inflatable airbag. Indeed, in this case, it is considered that the automobile vehicle is damaged, so that the emission of ammonia is interrupted for safety.

It will be noted that the invention is not limited to the embodiment described earlier, but may have diverse alternatives without departing from the scope of the claims.

In particular, it is possible to provide other detectors to detect other predefined situations, for example a temperature detector, the predefined situation being defined as being a situation in which the measured temperature is greater than a predetermined threshold.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A reduction device to reduce nitrogen monoxide and nitrogen dioxide emissions in exhaust gases of a combustion engine of an automobile vehicle, the reduction device including:
   at least one cartridge to store ammonia, each cartridge comprising an ammonia outlet orifice intended to be connected to an ammonia transport circuit towards an exhaust line of the combustion engine;
   an obturator for the at least one cartridge, the obturator capable of changing between a closed position to prevent ammonia from exiting the ammonia outlet orifice and an open position to allow ammonia to exit from the ammonia outlet orifice, and wherein the obturator includes a first maintainer using a first type of force to maintain the obturator in the closed position and a second maintainer using a second type of force to maintain the obturator in the open position;
   a detector to detect at least one anomaly that comprises at least a first situation in which a measured ammonia concentration is greater than a predetermined ammonia concentration threshold and a second situation in which an impact, releasing an amount of energy greater than a predetermined energy threshold, is detected;
   the detector includes an ammonia detection device, laid outside the ammonia transport circuit, and able to measure an ammonia concentration in air to identify the first situation in which the measured ammonia concentration is greater than the predetermined ammonia concentration threshold;
   an actuator to displace the obturator between the closed and open positions; and
   a controller configured to control the obturator, wherein the controller controls the actuator to close the obturator when the detector detects at least one of the first and second situations, and wherein the controller is powered by an electric energy source specific to the reduction device, distinct and independent of other standard energy sources of the automobile vehicle.

2. The reduction device according to claim 1, wherein said predetermined ammonia concentration threshold is comprised between 10 and 20 ppm.

3. The reduction device according to claim 1, wherein the detector includes an impact detection device of a system for triggering a safety inflatable airbag, the anomaly being a situation in which an impact causes triggering of the safety inflatable airbag.

4. The reduction device according to claim 1, wherein the obturator includes a member of a cylinder actuator type, comprising:
   a body, extending along a longitudinal direction, and comprising a first orifice, connected to the ammonia outlet orifice of the corresponding cartridge and a second orifice connected to said ammonia transport circuit,
   a piston comprising a head and a rod, said rod extending in the longitudinal direction and cooperating with a guide to guide the rod in translation in the longitudinal direction and being borne by the body, and wherein the piston is movable, in the longitudinal direction, between an obturation position, in which the head cooperates with the first orifice to obturate the first orifice, and a clearance position, in which the head is away from the first orifice, and
   the actuator displaces the piston between the obturation and clearance positions.

5. The reduction device according to claim 4, wherein the head is provided with a seal gasket that is able to cooperate with the body when the piston is in the obturation position, in order to sealably obturate the first orifice.

6. The reduction device according to claim 4, wherein:
   the actuator includes a solenoid surrounding the piston and coaxially positioned at the rod, said solenoid being able to generate a magnetic field in the longitudinal direction when an electric current flows through the solenoid and,
   the controller includes an electric current provider to have an electric current flow into said solenoid, the electric current provider comprising a switch able to reverse a direction of the electric current flowing in the solenoid.

7. The reduction device according to claim 6, wherein the controller includes an electric current generator connected to the electric current provider.

8. The reduction device according to claim 7, wherein the electric current generator is specific to the controller, distinct and independent of any other energy source of the automobile vehicle.

9. The reduction device according to claim 4, wherein the first maintainer maintains the piston in an obturation position.

10. The reduction device according to claim 9, wherein the first maintainer includes an elastic member with an axial effect, and which applies an elastic return force to the piston towards the obturation position, the elastic member extending longitudinally between a first seat borne by the head and a second seat borne by the body.

11. The reduction device according to claim 10, wherein the elastic member has stiffness greater than 0.8 N/m.

12. The reduction device according to claim 4, wherein the second maintainer maintains the piston in the clearance position.

13. The reduction device according to claim 12, wherein the second maintainer includes:
   a first magnetic element borne by the body, and a second magnetic element borne by the rod, and which is able to cooperate with the first magnetic element when the piston is in the clearance position, so that the first and second magnetic elements are attracted by a magnetic attraction force.

14. The reduction device according to claim 13, wherein the first maintainer maintains the piston in the obturation position,
the first maintainer includes an elastic member with an axial effect, applying an elastic return force to the piston towards the obturation position, the elastic member extending longitudinally between a first seat borne by the head and a second seat borne by the body, and
the first and second magnetic elements are able to generate an attraction force between them which is greater than the elastic return force generated by the elastic member.

15. The reduction device according to claim 1, wherein one of the first and second types of force comprises an elastic force and the other of the first and second types of force comprises a magnetic force.

* * * * *